United States Patent Office 3,452,001
Patented June 24, 1969

1

3,452,001
ENAMINOKETONE SULFIDES
Gerhard H. Alt and Angelo John Speziale, Creve Coeur, Mo., assignors to Monsanto Company, St. Louis, Mo., a corporation of Delaware
No Drawing. Continuation-in-part of application Ser. No. 303,943, Aug. 22, 1963. This application Aug. 12, 1966, Ser. No. 571,988
Int. Cl. C07c *149/42;* C07d *41/04, 87/46*
U.S. Cl. 260—239          14 Claims

ABSTRACT OF THE DISCLOSURE

Enaminoketone sulfides of the formula:

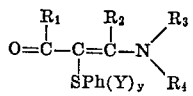

and their preparation, wherein $R_1$ is alkyl having a maximum of 4 carbon atoms, $R_2$ is hydrogen or alkyl having a maximum of 4 carbon atoms, $R_1$ and $R_2$ together can form a ring having 4 to 8 carbon atoms, inclusive; $R_3$ and $R_4$ are hydrogen, alkyl having a maximum of 4 carbon atoms and together forming a divalent radical selected from the group consisting of alkylene, —R—O—R—, and —R—S—R—; Y is halogen, alkoxy, alkyl, nitro or cyano; and y is an integer from zero to three.

The compounds are prepared by reacting the corresponding α,β-unsaturated amino substituted ketone with the appropriate sulfenyl chloride. These compounds have growth promoting effects when fed to animals. In addition, they possess anthelmintic activity and provide a source of assimilable nitrogen.

This application is a continuation-in-part of application Ser. No. 303,943 filed Aug. 22, 1963, now abandoned, by Angelo John Speziale and Gerhard H. Alt.

This invention relates to a new class of chemical compounds having growth promoting effects on animals fed thereon. The compounds which are readily prepared from available precursors have anthelmintic activity and provide assimilable nitrogen. Both of these useful functions contribute to the value of the compounds as growth promoting components in animal feeds.

2

The new compounds are prepared from enaminoketones and aromatic sulfenyl halides by the following reaction:

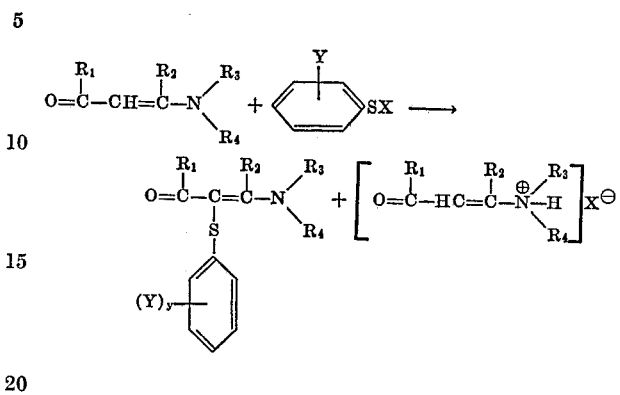

wherein $R_1$ is selected from the class consisting of alkyl having one to four carbon atoms and radicals such that $R_1$ and $R_2$ together are alkylene having one to ten carbon atoms providing a closed ring of four to eight carbon atoms; wherein $R_2$ is selected from the class consisting of hydrogen, alkyl having up to four carbon atoms, and radicals such that $R_1$ and $R_2$ together are alkylene as above defined; wherein $R_3$ and $R_4$ are selected from the class consisting of hydrogen, alkyl having up to four carbon atoms and radicals such that $R_3$ and $R_4$ together form divalent structures selected from the class consisting of alkylene of from two to eight carbon atoms, —R—O—R— in which the R's are alkylene of two to six carbon atoms and —R—S—R— in which the R's are alkylene of two to six carbon atoms; wherein Y is selected from the class consisting of chlorine, bromine, alkoxy having up to four carbon atoms, alkyl having up to four carbon atoms, nitro and cyano; wherein y is an integer from zero to three; and wherein X is selected from the class consisting of chlorine and bromine.

Preferred practice of the invention involves the reaction:

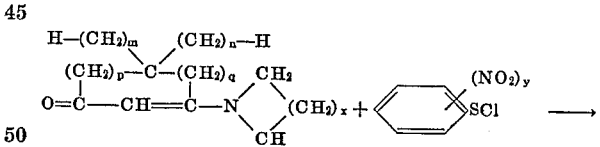

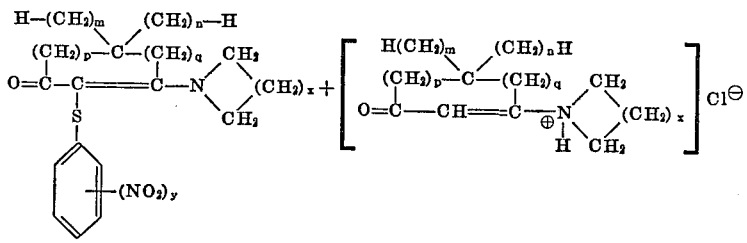

wherein m, n, p and q are integers from zero to two; wherein x is an integer from zero to five; and wherein y is an integer from zero to three.

The new compounds are prepared by contacting the reactants at temperatures between 50° C. and 180° C. The reaction is preferably conducted in an organic solvent solution which enables maintenance of the reaction temperature within the prescribed limits, for example at reflux temperature. By selection of the solvent, the concentration of the reactants in the solvent and the pressure, the reflux conditions can be established at any desired temperature. Suitable solvents are benzene, toluene, xylene, chlorobenzene, cyclopentane, n-hexane, cyclohexane, cyclooctane and any other inert water-immiscible organic solvent. Preferred operating conditions use temperatures from 100° C. to 150° C.

During the reaction the product and the by-product salt are precipitated. The crude product may be redissolved in hot methanol and crystallized by cooling. Further purification may be effected by converting the tertiary amine to an amine salt, for example for the perchlorate or the borofluoride.

Further details are set forth in the following examples.

EXAMPLE 1

A 5 percent molar excess of 2-nitrobenzenesulfenyl chloride and 5,5-dimethyl-3-N-pyrrolidylcyclohex-2-en-1-one were dissolved in benzene and heated at reflux temperatures for 4 hours. After cooling the precipitated solid was separated from the reaction mixture. The crude product was dissolved in aqueous methanol and crystallized as orange needles (M.P. 176 to 178° C.). It was identified by infrared and elemental analysis as 2-(2-nitrophenylthio)-5,5-dimethyl-3-N-pyrrolidylcyclohex - 2 - en - 1-one.

EXAMPLE 2

Using the procedure of the preceding example, benzenesulfenyl chloride was reacted with 5,5-diethyl-3-N-piperidylcyclohex-2-en-1-one. The product recovered from the reaction mixture was 2-(phenylthio)-5,5-diethyl-3-N-piperidylcyclohex-2-en-1-one having the structure:

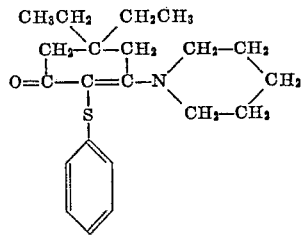

EXAMPLE 3

Using the above described procedure, 4-nitrobenzenesulfenyl chloride was reacted with 5,5-dimethyl-3-N-morpholinylcyclohex-2-en-1-one to produce 2-(4-nitrophenylthio)-5,5-dimethyl-3-N - morpholinylcyclohex - 2-en-1-one.

EXAMPLE 4

A toluene solution of 2,4-dichlorobenzenesulfenyl bromide was mixed with 5-ethyl-3-N - dimethylaminocyclohex-2-en-1-one whereby a compound identified as that having the following structure was found:

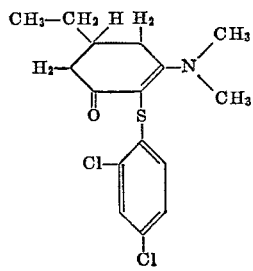

EXAMPLE 5

Using the procedure of Example 1, 4-toluenesulfenyl chloride was reacted with 4-N-isopropylaminopent-3-en-2-one whereby 3-(p-toluenethio)-4 - N - isopropylaminopent-3-en-2-one was formed.

EXAMPLE 6

The reaction of p-cyanobenzenesulfenyl chloride with 3-N-hexamethyleniminopent-2-en - 1 - one formed 2-4-cyanophenylthio)-3-N - hexamethyleniminopent 2 - en - 1-one.

EXAMPLE 7

The above procedure was repeated except that 3,4,5-tribromobenzenesulfenyl bromide was reacted with 3-N-diethylaminocyclopent-2-en-1-one. The product was identified as 2-(3,4,5-tribromophenylthio) - 3 - N - diethylaminocyclopent-2-en-1-one.

EXAMPLE 8

In a xylene solution, p-isopropylbenzenesulfenyl chloride was heated at reflux temperature with 3-N-pyrrolidylcyclooct-2-en-11one. This reaction produced 2-(4-isopropylphenylthio)-3-N-pyrrolidylcyclooct-2-en-1-one.

EXAMPLE 9

The procedure of Example 8 was repeated except benzenesulfenyl chloride was reacted with 4-N-piperidylbut-3-en-2-one to form 3-(phenylthio)-4-N-piperidylbut-3-en-2-one.

EXAMPLE 10

2-(4-methoxyphenylthio)-3-N-morpholycyclohept - 2--en-1-one was synthesized by the reaction of p-methoxybenzenesulfenyl chloride and 3-N-morpholycyclohept-2-en-1-one by the procedure of Example 1.

EXAMPLE 11

Using the procedure of Example 1, 4-nitrobenzenesulfenyl chloride was reacted with 5-N-di(n-propyl) aminohept-4-en-3-one whereby 4-(4-nitrophenylthio)-5-N-di-n-propylaminohept-4-en-3-one was formed.

EXAMPLE 12

The reaction of benzenesulfenyl chloride with 3-N-hexamethyleniminocyclohex-2-en-1-one was found to produce a compound identified as 2-phenylthio-3-N-hexamethyleniminocyclohex-2-en-1-one having the structure

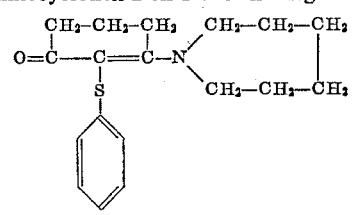

EXAMPLE 13

The procedure of Example 3 was repeated except that 5,5-dimethyl-3-N-thiomorpholinyl was used in place of the morpholinyl derivative. The compound thereby prepared was 2-(4-nitrophenylthio)-5,5-dimethyl-3-N - thiomorpholinylcyclohex-2-en-1-one.

Although the invention is described by the above specific examples it is not intended that the details thereof are limitations on the scope of the invention except to the extent incorporated in the following claims.

What is claimed is:

1. A compound of the structure

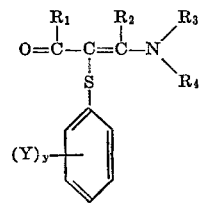

wherein $R_1$ is selected from the class consisting of alkyl having one to four carbon atoms, and radicals such that $R_1$ and $R_2$ together are alkylene having one to ten carbon atoms providing a closed ring of four to eight carbon atoms; wherein $R_2$ is selected from the class consisting of hydrogen, alkyl having up to four carbon atoms and radicals such that $R_1$ and $R_2$ together are alkylene as above defined; wherein $R_3$ and $R_4$ are selected from the class consisting of hydrogen, alkyl having up to four carbon atoms and radicals such that $R_3$ and $R_4$ together are divalent structures of the class consisting of alkylene having from four to eight carbon atoms, —R—O—R— in which which R is alkylene having two carbon atoms, and —R—S—R— in which R is alkylene having two carbon atoms; wherein Y is selected from the class consisting of chlorine, bromine, alkoxy having up to four carbon atoms, alkyl having up to four carbon atoms, nitro, cyano, and amino and wherein $y$ is an integer from zero to three.

2. A compound of the structure

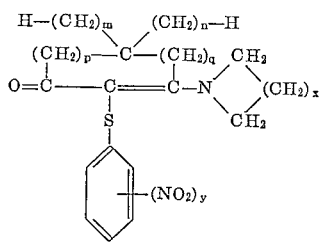

wherein $m$, $n$, $q$ and $p$ are integers from zero to two; wherein $y$ is an integer from zero to three; and wherein $x$ is an integer from zero to five.

3. The compound of claim 2 wherein $m$, $n$, $p$, $q$ and $y$ are each one, wherein the nitro group is in the "ortho" position and wherein $x$ is two.

4. The compound of claim 2 wherein $m$ and $n$ are each two, wherein $p$ and $q$ are each one, wherein $x$ is three and wherein $y$ is zero.

5. The compound of claim 1 wherein $R_1$ and $R_2$ together is —$CH_2$—$C(CH_3)_2$—$CH_2$—, wherein $y$ is one, wherein Y is nitro in the "para" position and wherein $R_3$ and $R_4$ together is —$CH_2CH_2$—O—$CH_2$—$CH_2$—.

6. The compound of claim 1 wherein $R_1$ is methyl, $R_2$ and $R_3$ are each hydrogen, $R_4$ is isopropyl, $y$ is one and Y is methyl in the "para" position.

7. The compound of claim 1 wherein $R_1$ and $R_2$ together is —$CH_2$—$C(CH_3)_2$—$CH_2$—, wherein $R_3$ and $R_4$ together is hexamethylene, wherein $y$ is one and wherein Y is cyano in the "para" position.

8. The method of preparing phenylthioenaminoketones which comprises mixing, at a temperature in the range of 50 to 180° C., a compound of the structure

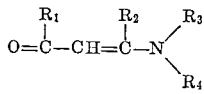

wherein $R_1$ is selected from the class consisting of alkyl having one to four carbon atoms and radicals such that $R_1$ and $R_2$ together are alkylene having one to ten carbon atoms providing a closed ring of four to eight carbon atoms; wherein $R_2$ is selected from the class consisting of hydrogen, alkyl having up to four carbon atoms, and radicals such that $R_1$ and $R_2$ together are alkylene as above defined; wherein $R_3$ and $R_4$ are selected from the class consisting of hydrogen, alkyl having up to four carbon atoms and radicals such that $R_3$ and $R_4$ together form divalent structures selected from the class consisting of alkylene of from four to eight carbon atoms,

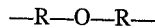

in which the R's are alkylene having two carbon atoms, and —R—S—R— in which the R's are alkylene having two carbon atoms; and a compound of the structure

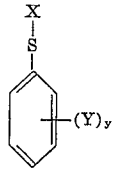

wherein X is selected from the class consisting of chlorine and bromine, wherein Y is selected from the class consisting of chlorine, bromine, alkoxy of up to four carbon atoms, alkyl of up to four carbon atoms, nitro and cyano, and wherein $y$ is an integer from zero to three.

9. A method of preparing a phenylthioenaminoketone which comprises mixing a compound of the structure

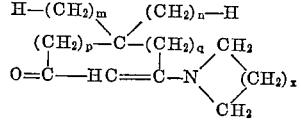

wherein $m$, $n$, $p$ and $q$ are integers from zero to two and $x$ is an integer from zero to four with a compound of the structure

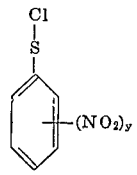

wherein $y$ is an integer from zero to three and heating the mixture at reflux temperature in an inert organic solvent boiling between 50° C. and 175° C.

10. The method of claim 8 wherein 2-nitrobenzenesulfenyl chloride is reacted with 5,5-dimethyl-3-N-pyrrolidylcyclohex-2-en-1-one.

11. The method of claim 8 wherein benzenesulfenyl chloride is reacted with 5,5-diethyl-3 - N - piperidylcyclohex-2-en-1-one.

12. The method of claim 8 wherein 4-nitrobenzene-sulfenyl chloride is reacted with 5,5-dimethyl-3-N-morpholinylcyclohex-2-en-1-one.

13. The method of claim 8 wherein 4-toluenesulfenyl chloride is reacted with 4-N-isopropylaminopent-3-en-2-one.

14. The method of claim 8 wherein p-cyanobenzenesulfenyl chloride is reacted with 3-N-hexamethyleniminopent-2-en-1-one.

No references cited.

ALTON D. ROLLINS, *Primary Examiner.*

U.S. Cl. X.R.

99—2; 260—240, 243, 247.1, 293.4, 326.5, 327, 333, 465, 570.5, 999